(12) United States Patent
Kim et al.

(10) Patent No.: US 10,649,100 B2
(45) Date of Patent: May 12, 2020

(54) X-RAY DETECTOR

(71) Applicant: LG Display Co., Ltd., Seoul (KR)

(72) Inventors: Kangwoo Kim, Gwangju (KR); Siu Yoon, Goyang-si (KR); Sejin Shin, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/222,835

(22) Filed: Dec. 17, 2018

(65) Prior Publication Data

US 2019/0187300 A1 Jun. 20, 2019

(30) Foreign Application Priority Data

Dec. 19, 2017 (KR) .......................... 10-2017-0175140

(51) Int. Cl.
*G01T 1/208* (2006.01)
*G01T 1/20* (2006.01)

(52) U.S. Cl.
CPC ................ *G01T 1/208* (2013.01); *G01T 1/20* (2013.01); *G01T 1/2018* (2013.01)

(58) Field of Classification Search
CPC .......... G01T 1/208; G01T 1/20; G01T 1/2018
See application file for complete search history.

(56) References Cited

U.S. PATENT DOCUMENTS

| | | | |
|---|---|---|---|
| 2007/0164333 A1* | 7/2007 | Wright | H01L 27/12 257/292 |
| 2010/0320391 A1* | 12/2010 | Antonuk | H01L 27/14689 250/366 |
| 2012/0153173 A1* | 6/2012 | Chang | H01L 27/14603 250/370.08 |
| 2013/0001426 A1* | 1/2013 | Tredwell | G01T 1/2018 250/370.09 |
| 2013/0334436 A1* | 12/2013 | Yamada | H04N 5/32 250/394 |
| 2018/0329084 A1* | 11/2018 | Karim | G01T 1/247 |

* cited by examiner

*Primary Examiner* — Christine S. Kim
(74) *Attorney, Agent, or Firm* — Fenwick & West LLP

(57) ABSTRACT

The present disclosure relates to an X-ray detector. The X-ray detector includes the first and second gate lines arranged to be spaced apart from each other on a substrate, a data line and a bias line that are arranged to be spaced apart from each other in a direction intersecting the first and second gate lines, and define a unit pixel area, a storage capacitor that is arranged in the unit pixel area and has one end connected to a ground, a phototransistor that is turned on by a reset signal applied to the first gate line and provides a signal generated by an incident light source to the storage capacitor, and a thin film transistor that is turned on by a gate signal applied to the second gate line to provide a charge stored in the storage capacitor to the data line.

20 Claims, 9 Drawing Sheets

100

100

X-RAY DETECTOR

CROSS-REFERENCE TO RELATED APPLICATION

This application claims priority to and the benefit of Republic of Korea Patent Application No. 10-2017-0175140, filed on Dec. 19, 2017, which is incorporated by reference in its entirety.

BACKGROUND

1. Field of Technology

The present disclosure concept relates to an X-ray detector. Specifically, the present disclosure concept relates to an X-ray detector including a unit pixel area formed of a phototransistor, a thin film transistor, and a storage capacitor.

2. Description of Related Art

An inspection method of a diagnostic X-ray device which is widely used for medical purposes currently captures photographs using an X-ray detecting film and has to take a predetermined film printing time in order to know the result thereof.

Recently, however, a digital X-ray detector (hereinafter referred to as "X-ray detector") using a thin film transistor has been researched/developed due to a development of semiconductor technology.

The X-ray detector has an advantage that the thin film transistor is used as a switching element, and an X-ray image is displayed on a screen in real time immediately after photographing an X-ray to diagnose the result thereof.

FIG. 1 is a circuit view showing a unit pixel area of a conventional X-ray detector.

Referring to FIG. 1, a unit pixel area of an X-ray detector includes one photodiode and one thin film transistor TFT. The photodiode converts an incident light source into a photocurrent, and the photocurrent is transmitted to a data line (not shown) through the TFT (thin film transistor) operating as a switching element.

At this time, the photodiode determines a light detecting and a noise characteristic according to the thickness and the processing method in a P-I-N stacking structure (e.g., P-type semiconductor-intrinsic semiconductor-N-type semiconductor), which also has a great influence on a mass production yield. That is, since the photodiode determines the properties of the X-ray detector itself, such as process yield, a noise characteristic, and an ability to transmit a light signal transmitted from a photoconductive film (not shown), a significantly high difficulty is required in a manufacturing process.

Therefore, as the conventional X-ray detector uses a photodiode, there have been the problems of low process yield and high manufacturing cost.

SUMMARY

A technical problem to be solved of the present disclosure is to provide an X-ray detector which includes a unit pixel area having a phototransistor and a storage capacitor in place of a photodiode, thereby increasing process yield and lowering manufacturing cost.

The objects of the present disclosure are not limited to the above-mentioned object, and other objects and advantages of the present disclosure which are not mentioned can be understood by the following description and more clearly understood by the embodiments of the present inventive concept. It will be also easily seen that the objects and advantages of the inventive concept may be realized by means indicated in patent claims and a combination thereof.

According to one aspect of the present disclosure in order to achieve a solution to the technical problem, an X-ray detector, comprising: a substrate; a first gate line on the substrate; a second gate line on the substrate, the second gate line spaced apart from the first gate line; a data line on the substrate, the data line intersecting the first gate line and the second gate line; a bias line on the substrate, the bias line spaced apart from the data line and intersecting the first gate line and the second gate line, the intersections of the data line, bias line, first gate line, and the second gate line defining a unit pixel area; a storage capacitor arranged in the unit pixel area, the storage capacitor having one end connected to ground; a phototransistor that is turned on by a reset signal applied to the first gate line, the phototransistor connected to another end of the storage capacitor and providing a charge generated by an incident light source to the other end of the storage capacitor; and a thin film transistor that is turned on by a gate signal applied to the second gate line, the thin film transistor connected to the other end of the storage capacitor and providing a charge stored in the storage capacitor to the data line.

In one embodiment, an X-ray detector comprises: a substrate; a ground line on the substrate; an insulating film over the substrate, the insulating film exposing a portion of the ground line; a first active pattern and a second active pattern spaced apart from each other on the insulating film; a first gate line on the first active pattern; a second gate line on the second active pattern; a first interlayer insulating film over the first gate line, the second gate line, the first active pattern, the second active pattern, and the insulating film, the first interlayer insulating film comprising a contact hole that exposes the portion of the ground line; a bias line on a first side of the first gate line, the bias line in contact with the first active pattern through the first interlayer insulating film; a first electrode on a second side of the first gate line that is opposite the first side of the gate line, the first electrode in contact with the first active pattern through the first interlayer insulating film; a second electrode on a first side of the second gate line, the second electrode in contact with the second active pattern through the first interlayer insulating film; a data line on a second side of the second gate line that is opposite the first side of the gate line, the data line in contact with the second active pattern through the first interlayer insulating film; a ground electrode in contact with the exposed portion of the ground line though the contact hole in the first interlayer insulating film; a second interlayer insulating film over the bias line, the first electrode, the second electrode, the data line, and the ground electrode; a first storage electrode in contact with the first electrode through the second interlayer insulating film, the first storage electrode overlapping a first end of the ground electrode; and a second storage electrode in contact with the second electrode through the second interlayer insulating film, the second storage electrode overlapping a second end of the ground electrode that is opposite the first end of the ground electrode, the second storage electrode horizontally spaced apart from the first storage electrode.

In one embodiment, an X-ray detector comprises: a substrate; a first transistor including a first active pattern on the substrate; a second transistor including a second active pattern on the substrate; a ground electrode on the substrate, the ground electrode between the first transistor and the second transistor; a first storage electrode that partially overlaps the first active pattern and overlaps a first end of the ground electrode; a second storage electrode that completely overlaps the second active pattern and overlaps a second end of the ground electrode that is opposite the first end of the ground electrode; and a scintillator layer that emits light in response to receiving an X-ray; wherein the second storage electrode shields the second active pattern of the second transistor from the emitted light and the first storage electrode partially shields the first active pattern of the first transistor from the emitted light.

The X-ray detector of the present inventive concept includes the unit pixel area having the phototransistor and the storage capacitor in place of the photodiode, so that an application of a large area process can be facilitated. As a result, the X-ray detector of the present disclosure can improve yield of the manufacturing process, and as the manufacturing process is reduced, the manufacturing cost can be also reduced.

In addition, the X-ray detector of the present inventive concept can improve a photodetection characteristic of the pixel area by using a structure including the phototransistor and the storage capacitor having a higher signal sensing sensitivity than a photodiode.

DETAILED DESCRIPTION

Figure 1:
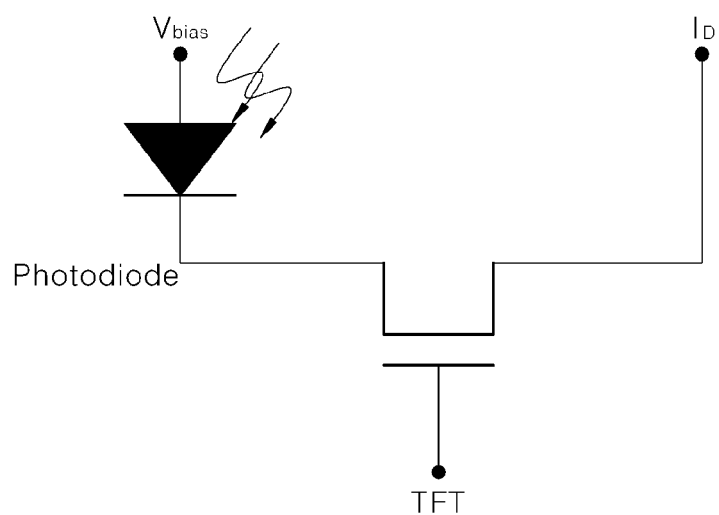
FIG. 1 is a circuit view showing another unit pixel area of a conventional X-ray detector.

The above-mentioned objects, features, and advantages of the present disclosure will be described in detail with reference to the accompanying drawings, and accordingly, the technical idea of the present disclosure can be easily performed by those skilled in the art. In describing the present disclosure, when it is determined that the detailed description of the known technique related to the present inventive concept may unnecessarily obscure the gist of the preset disclosure, a detailed description will be omitted. Hereinafter, the embodiments according to the present disclosure will be described in detail with reference to the accompanying drawings. In the drawings, the same reference numerals are used to indicate the same or similar components.

Hereinafter, an X-ray detector in accordance with some embodiments of the present disclosure will be described in detail with reference to FIGS. 2 to 10.

Figure 2:
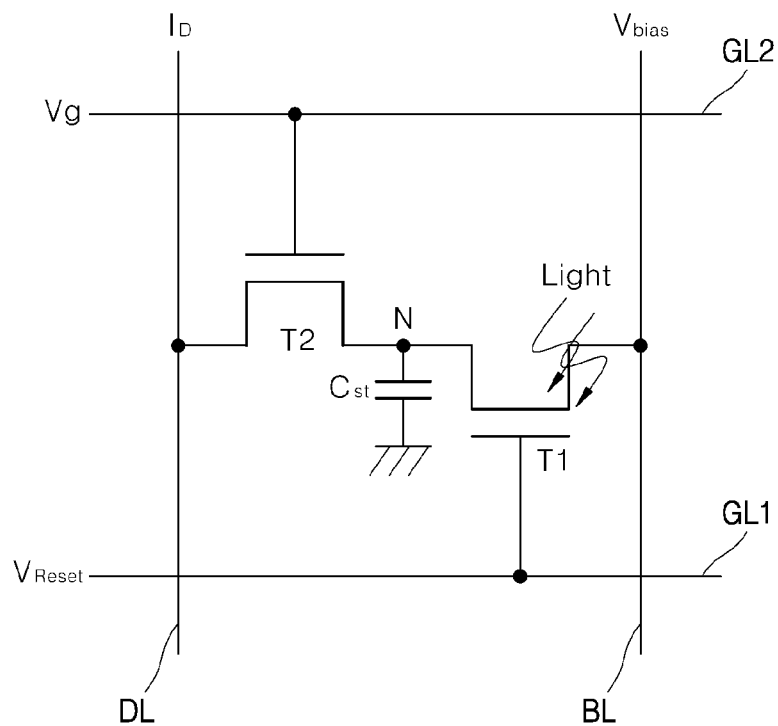
FIG. 2 is a circuit view showing a unit pixel area of an X-ray detector in accordance with some embodiments of the present disclosure.

FIG. 2 is a circuit view showing a unit pixel area of an X-ray detector in accordance with some embodiments of the present disclosure.

Referring to FIG. 2, the unit pixel area 100 of the X-ray detector in accordance with some embodiments of the present disclosure includes a phototransistor T1, a storage capacitor Cst, and a thin film transistor T2.

The X-ray detector includes a plurality of unit pixel areas 100. At this time, one unit pixel area 100 is defined by a first gate line GL1, a second gate line GL2, a data line DL, and a bias line BL.

The first gate line GL1 and the second gate line GL2 may be formed to extend in a first direction (for example, a row direction). At this time, the first gate line GL1 and the second gate line GL2 may be arranged to be spaced apart from each other and arranged parallel to each other.

A reset signal Vreset used for gating (i.e., turning on or turning off) the phototransistor T1 may be applied to the first gate line GL1. A gate signal Vg used for gating (i.e., turning on or turning off) the thin film transistor T2 may be applied to the second gate line GL2.

The data line DL and the bias line BL may be formed to extend in a second direction (for example, a column direction) intersecting with the first direction. At this time, the data line DL and the bias line BL may be arranged to be spaced apart from each other and arranged parallel to each other.

At this time, the data line DL is connected to one end (e.g., the source or drain t) of the thin film transistor T2 and can receive a charge stored in the storage capacitor Cst and transfer it to an external circuit. A power source of a certain size is applied to the bias line BL and may be connected to one end (e.g., the source or drain electrode) of the phototransistor T1.

The phototransistor T1 is gated by the reset signal Vreset applied to the first gate line GL1 and the source/drain terminals are connected to a bias line BL: and a central node N, respectively. For example, the drain terminal of the phototransistor T1 is connected to the bias line BL, and the source terminal is connected to one side of the storage capacitor Cst, and the gate electrode is connected to the first gate line GL1. However, the present disclosure is not limited thereto, and the source/drain terminals may be changed each other.

The phototransistor T1 can transmit a charge generated in an active layer of the phototransistor T1 by a light source generated in a photoconductive film (not shown) to the storage capacitor Cst. At this time, a channel area is formed in the active layer of the phototransistor T1, and the active layer can be formed of at least one material of a-Si (amorphous silicon), polycrystalline silicon, LTPS (that is, Low-temperature poly-Si), a Transition Metal Dichalcogenides, Si (silicon), an oxide semiconductor, an organic semiconductor, or a semiconductor of a III-V compound. However, it is only an example, and the present disclosure is not limited thereto.

The thin film transistor T2 is gated by a gate signal Vg applied to the second gate line GL2 and the source/drain terminals are connected to a data line DL and a central node N, respectively. For example, a source electrode of the thin film transistor T2 may be connected to one side of the storage capacitor Cst, and a drain electrode may be connected to the data line DL, and a gate electrode may be connected to the second gate line GL2. However, the present disclosure is not limited thereto, and the source/drain terminals may be mutually changed.

The thin film transistor T2 can provide a charge stored in the storage capacitor Cst to the data line DL. At this time, the thin film transistor T2 may be formed through the same process as the phototransistor T1. Therefore, an active layer of the thin film transistor T2 can be formed of the same material as the active layer of the phototransistor T1.

Here, the material included in the active layer may be represented by $A_xB_yC_zO$ (x, y, z≥0), and each of A, B, and C may be selected from Zinc (Zn), Cadmium (Cd), Gallium (Ga), Indium (In), Tin (Sn), Hafnium (Hf), and Zirconium (Zr). For example, the material may be selected from ZnO, InGaZnO4, ZnInO, ZnSnO, InZnHfO, SnInO and SnO, and IGZO (Indium Gallium Zinc Oxide, in particular InGaZnO4) may be used in view of a transparent material and an easiness of process. However, the present disclosure is not limited thereto, and the active layer of the thin film transistor T2 may be formed of a different material from the active layer of the phototransistor T1.

The storage capacitor Cst can store the charge. One end of the storage capacitor Cst may be connected to a ground GND and the other end may be connected to a central node N. The storage capacitor Cst stores the charge provided in the phototransistor T1 and transmits the stored charge to the data line DL through the thin film transistor T2.

That is, the unit pixel area 100 of the X-ray detector includes a 2T 1C structure formed of two transistors (phototransistor T1 and thin film transistor T2) and one capacitor (storage capacitor Cst).

The structure including the phototransistor T1 and the storage capacitor Cst has a signal sensing sensitivity higher than that of a structure using a conventional photodiode. Therefore, a light detection property of the X-ray detector of the present disclosure can be improved as compared with a conventional technique using the photodiode.

Figure 3:
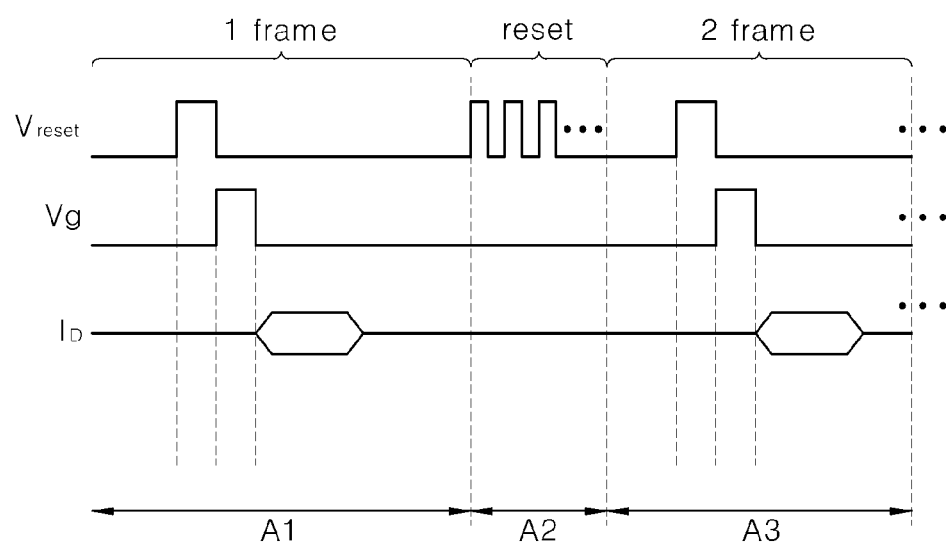
FIGS. 3 and 4 are views explaining an operation of an X-ray detector in accordance with some embodiments of the present disclosure.
Figure 4:
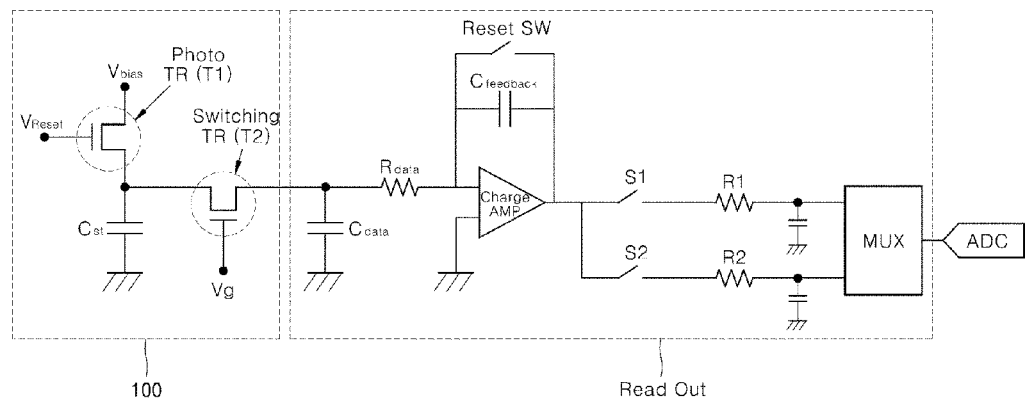

FIGS. 3 and 4 are the views for explaining an operation of an X-ray detector in accordance with some embodiments of the present disclosure.

Referring to FIG. 3, the X-ray detector measures a light amount generated by a light source (for example, an X-ray) incident for a certain time to generate one frame (1 frame). In a section A1 corresponding to one frame, a reset signal Vreset is first applied to a gate terminal of a phototransistor T1. In this case, while the reset signal Vreset is applied to the gate terminal, in the phototransistor T1, a charge generated by the incident light source is gathered in a channel region, and the generated charge is stored in a storage capacitor Cst.

Then, when a gate signal Vg is applied to a gate terminal of a thin film transistor T2, a charge stored in a storage capacitor Cst is transmitted to a data line DL through a thin film transistor T2.

Then, a section A2 to reset a charge stored in the phototransistor T1 is inserted between the section A1 corresponding to one frame and a section A3 corresponding to the next frame. The section A2 (for example, a reset section), a reset signal to change a signal level is applied to the gate terminal of the phototransistor T1 so that the phototransistor T1 is turned on and off once or more. In the section A2, the charge generated in the channel area of the phototransistor T1 can be emitted to the outside, and the phototransistor T1 can be initialized to measure an accurate amount of light in the next frame.

Referring to FIG. 4, a current signal by a charge transmitted from the unit pixel area 100 to a data line (DL) is transmitted to a ReadOut.

The ReadOut is a circuit that amplifies the received current signal through an amplifier (charge AMP). A first input terminal of the amplifier Charge AMP is connected to one end of a resistor Rdata and a second input terminal of the amplifier Charge AMP is connected to ground. Another end of the resistor Rdata is connected to a capacitor Cdata. Furthermore, the first input terminal and output terminal of the amplifier Charge AMP is connected to a feedback circuit that includes a switch Reset SW and a capacitor Cfeedback. As shown in FIG. 4, the switch Reset SW and the capacitor Cfeedback are connected in parallel. The ReadOut acquires a dark image and a bright image through a first switch S1 and a second switch S2, respectively. The first switch S1 and the second switch S2 are respectively in series with resistor R1 and resistor R2. At this time, the ReadOut operates by using a DCS (Double Correlation Sampling) method for image acquisition.

Then, the ReadOut transmits an analog signal relating to the acquired image to an ADC through an MUX. The MUX includes two input terminals. The first input terminal of the MUX is connected to the resistor R1 and a first output capacitor. The second input terminal of the MUX is connected to the resistor R2 and a second output capacitor. The ADC can convert a received analog signal into a digital signal to display an image.

For example, when a part of the body is X-rayed, an amount of charge to be charged in a charge collecting electrode is large as a result of the X-ray transmitting to a part of the body, and an amount of charge to be charged in a charge collecting electrode is small when X-ray transmittance is low. The difference in charge can be displayed through the image.

Figure 5:
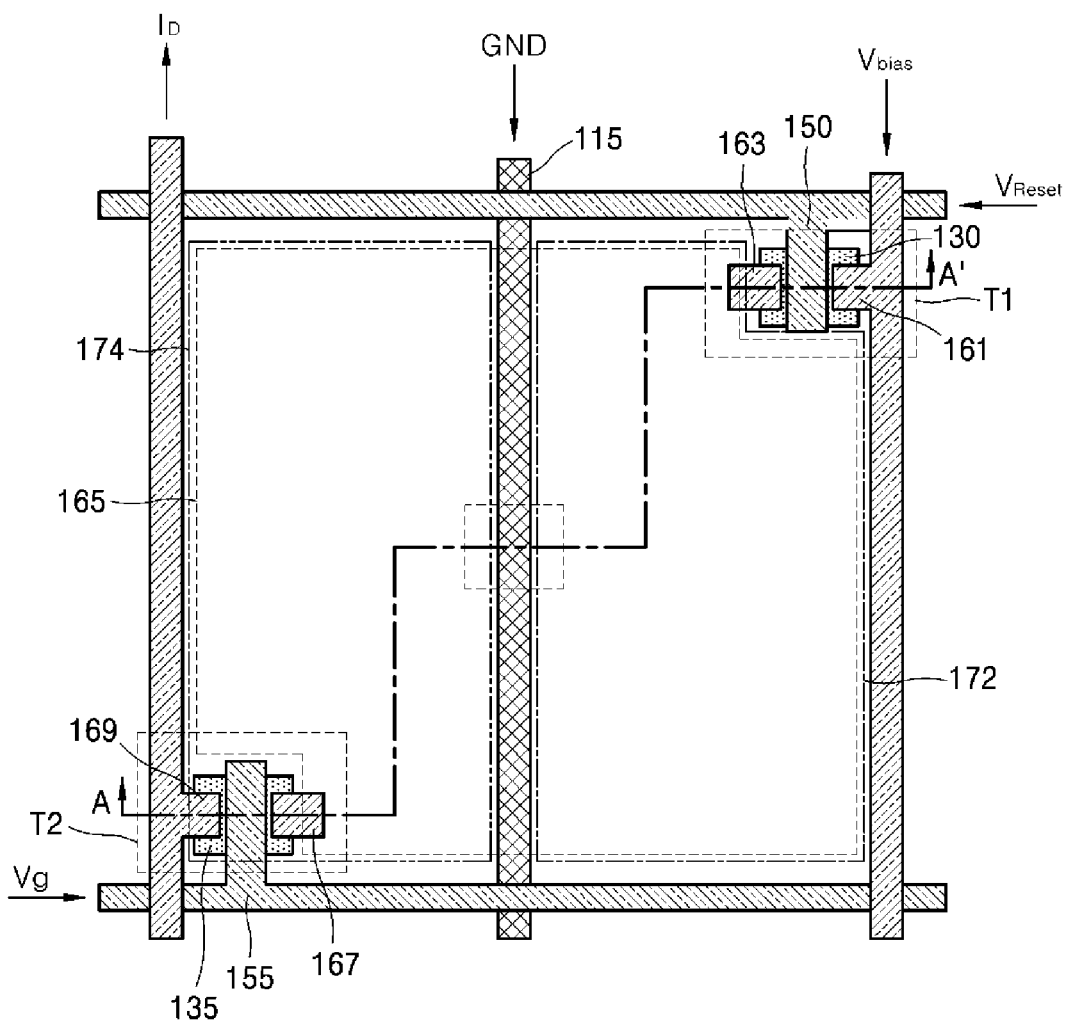
FIG. 5 is a front view showing a unit pixel area of an X-ray detector in accordance with some embodiments of the present disclosure.
Figure 6:
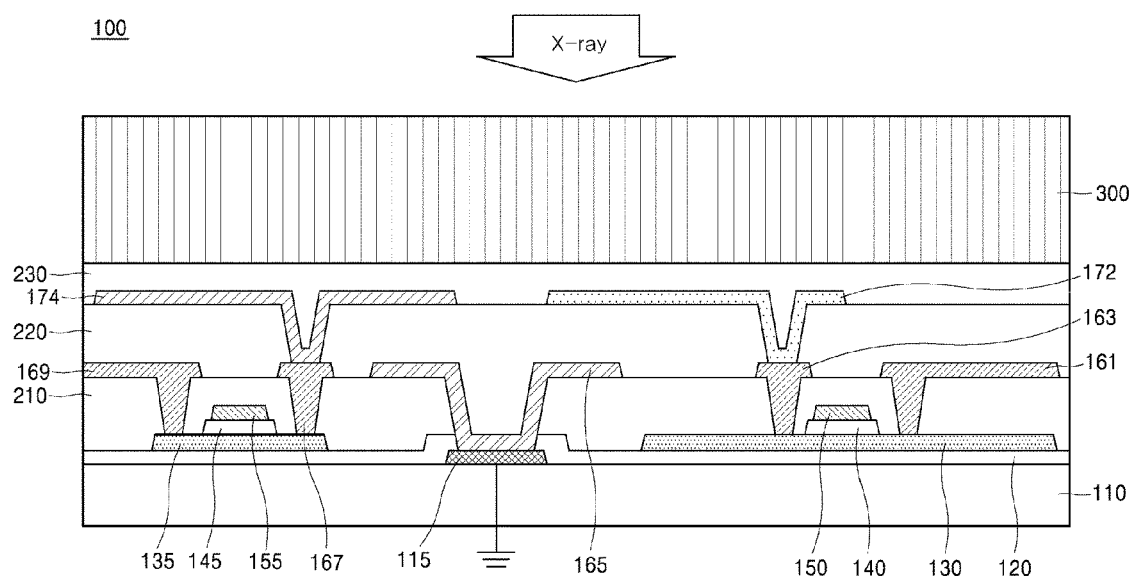
FIG. 6 is a cross-sectional view showing a unit pixel area of an X-ray detector in accordance with an exemplary embodiment of the present disclosure.

FIG. 5 is a front view showing a unit pixel area of an X-ray detector in accordance with some embodiments of the present disclosure. FIG. 6 is a cross-sectional view showing a unit pixel area of an X-ray detector in accordance with an exemplary embodiment of the present disclosure. At this time, FIG. 6 is a cross-sectional view taken along the area A-A' in FIG. 5.

Referring to FIG. 5, the unit pixel area of the X-ray detector in accordance with some embodiments of the present disclosure is defined by a first gate line 150, a second gate line 155, a bias line 161, and a data line 169. At this time, the first gate line 150 and the second gate line 155 may extend in a first direction and may be arranged to be spaced apart from each other. The bias line 161 and the data line 169 extended in a second direction intersecting the first direction and can be arranged to be spaced apart from each other.

Here, a reset signal Vreset is applied to the first gate line 150, a gate signal Vg is applied to the second gate line 155, and a bias voltage Vbias is applied to the bias line 161, and a current signal Id for a light source is outputted to the data line 169. Here, the bias voltage Vbias may be a DC power having a certain size.

A phototransistor T1 is formed in an area where the first gate line 150 and the bias line 161 intersect and a thin film transistor T2 is formed in an area where the second gate line 155 and the data line 169 intersect. For example, the phototransistor T1 may be formed on an upper left portion of the unit pixel area, and the thin film transistor T2 may be arranged on a lower right portion. However, this is only an example, and the present inventive concept is not limited thereto.

A ground line 115 may be arranged to divide into two unit pixel areas. A ground electrode 165 electrically connected to the ground line 115 and widely arranged in the unit pixel area, a first storage electrode 172 arranged to be overlapped with one side (e.g., a first side) of the ground electrode 165, and a second storage electrode 174 arranged to be overlapped with the other side (e.g., a second side) of the ground electrode 165 are formed in the unit pixel area. At this time, although the upper surfaces of the first storage electrode 172 and the second storage electrode 174 are arranged on the same plane, they are formed to be spaced apart from each other. Further, the ground electrode 165 is arranged to be spaced apart from the first storage electrode 172 and the second storage electrode 174.

A storage capacitor Cst can be defined as a sum of a first capacitance C1 between a ground electrode 165 and a first storage electrode 172 and a second capacitance C2 between a ground electrode 165 and a second storage electrode 174.

At this time, the first storage electrode 172 and the second storage electrode 174 may be formed of different materials from each other. The first storage electrode 172 may be formed of a transparent material that passes a light source. For example, the first storage electrode 172 may include a transparent conducting film such as ITO (Indium Tin Oxide), TO (Tin Oxide), IZO (Indium Zinc Oxide), or ITZO (Indium Tin Zinc Oxide)).

The second storage electrode 174 may be formed of a metal material to block a light source. For example, the second storage electrode 174 may include any one of nickel, copper, silver, potassium, magnesium, cadmium, and aluminum, and two or more metals may be used by mixing. However, this is only an example, and the present disclosure is not limited thereto.

Referring to FIG. 6, a substrate 110 is arranged at a lowermost portion of the unit pixel area in accordance with an exemplary embodiment of the present inventive concept. The substrate 110 may be formed of a transparent glass substrate having a high light transmittance. However, this is only an example, and the present disclosure is not limited thereto.

On the substrate 110, a ground line 115 extending in one direction is formed. The ground line 115 may be formed to contact with an upper surface of the substrate 110.

An insulating layer 120 is formed to cover the upper surface of the substrate 110 and to expose a part (e.g., a portion) of the ground line 115. The insulating layer 120 may be formed uniformly along the upper surface of the substrate 110 and the ground line 115 (that is, may be formed to have the same thickness), and can expose a part of an upper surface of the ground line 115 through an etching process.

A first active pattern 130 and a second active pattern 135 are formed to be spaced apart from each other on the insulating layer 120. The first active pattern 130 and the second active pattern 135 may be formed through the same process. Therefore, the first active pattern 130 and the second active pattern 135 may be formed of the same material.

For example, the first active pattern 130 may be formed of at least one material such as a-Si (amorphous silicon), polycrystalline silicon, LTPS (that is, Low-temperature poly-Si), Transition Metal Dichalcogenides), Si (silicon), an oxide semiconductor, an organic semiconductor, or a semiconductor of a III-V compound.

However, the present disclosure is not limited thereto, and the first active pattern 130 and the second active pattern 135 may be formed of different materials from each other through different processes from each other.

A first gate line 150 is formed on the first active pattern 130. The first gate line 150 operates as a gate electrode of a phototransistor T1 and a reset signal Vreset can be applied. A first gate insulating layer 140 may be formed between the first active pattern 130 and the first gate line 150.

Likewise, a second gate line 155 is formed on the second active pattern 135. The second gate line 155 operates as a gate electrode of a thin film transistor T2 and a gate signal Vg can be applied. A second gate insulating layer 145 may be formed between the second active pattern 135 and the second gate line 155.

Here, the first gate line 150 and the second gate line 155 may include a conductive material. However, the present disclosure is not limited thereto, and the first gate line 150 and the second gate line 155 may be made of a non-metal such as polysilicon.

Further, the first gate insulating film 140 and the second gate insulating film 145 may include a material selected from the group including high-k (high dielectric layer) HfO2, ZrO2, Ta2O5, TiO2, SrTiO3, or (Ba, Sr) TiO3. The first and second gate insulating layers 140 and 145 may be formed to have an appropriate thickness depending on an included material.

A first interlayer insulating film 210 that covers the first and second gate lines 150 and 155, the first and second active patterns 130 and 135, and the insulating film 120, and includes a contact hole to expose a part of the ground line is formed on the substrate 110.

The first interlayer insulating film 210 can be in charge of electrically isolating a semiconductor device in a lower portion of the first interlayer insulating film 210 and a semiconductor device in an upper portion of the first interlayer insulating film 210. The first interlayer insulating film may be formed by using a silicon oxide such as BSG (borosilicate Glass), PSG (phosphoSilicate Glass), BPSG (boroPhosphoSilicate Glass), USG (Undoped Silicate Glass), TEOS (TetraEthylOrthoSilicate Glass), or HDP-CVD (High Density Plasma-CVD), etc.

Multiple contact holes may be formed in the first interlayer insulating film 210. A bias line 161, a first electrode 163, a ground electrode 165, a second electrode 167, and a data line 169 filling the respective contact hole are formed on the first interlayer insulating film 210. At this time, an upper surface of each of the bias line 161, the first electrode 163, the ground electrode 165, the second electrode 167, and the data line 169 may be arranged on the same plane. However, the present disclosure is not limited thereto.

Specifically, the bias line 161 is formed on one side of the first gate line 150 contacts with an upper surface of the first active pattern 130 through the first interlayer insulating film 210. The first electrode 163 is formed on the other side of the first gate line 150 and contacts an upper surface of the first active pattern 130 through the first interlayer insulating film 210. The bias line 161 and the first electrode 163 may be electrically connected to a source or drain terminal of the phototransistor T1, respectively.

Further, the second electrode 167 is formed on one side of the second gate line 155 and contacts the upper surface of the second active pattern 135 through the first interlayer insulating film 210. The data line 169 is formed on the other side of the second gate line 155 and contacts with the upper surface of the second active pattern 135 through the first interlayer insulating film 210. The second electrode 167 and the data line 169 may be electrically connected to a source or drain terminal of the thin film transistor T2, respectively.

Further, the ground electrode 165 contacts the upper surface of the ground line 115 exposed by a contact hole CH1 and can be formed conformally along an inner surface of the contact hole CH1 and the upper surface of the first interlayer insulating film 210.

Then, a second interlayer insulating film 220 that covers the upper surfaces of the bias line 161, the first electrode 163, the ground electrode 165, the second electrode 167 and the data line 169 is formed on the first interlayer insulating film 210. The second interlayer insulating film 220 may be formed of substantially the same material as the first interlayer insulating film 210.

Multiple contact holes may be formed in the second interlayer insulating film 220 and a first storage electrode 172 and a second storage electrode 174 to fill a contact hole may be formed on the second interlayer insulating film 220.

The first storage electrode 172 is formed to contact with the upper surface of the first electrode 163 through the second interlayer insulating film 220 and to be overlapped with one side of the ground electrode 165. At this time, the first storage electrode 172 may be formed to be overlapped with only a part of the first active pattern 130 in which the phototransistor T1 is formed.

The first active pattern 130 may include a transparent material that passes a light source. For example, the first active pattern 130 may be formed of a transparent conducting material such as ITO (Indium Tin Oxide), TO (Tin Oxide), IZO (Indium Zinc Oxide), or ITZO (Indium Tin Zinc Oxide).

The second storage electrode 174 is formed to contact with the upper surface of the second electrode 167 through the second interlayer insulating film 220 and to be overlapped with the other side of the ground electrode 165. At this time, the second storage electrode 174 may be formed to be completely overlapped with the second active pattern 135 formed with the thin film transistor T2. However, the present disclosure is not limited thereto, and the second storage electrode 174 may be overlapped with only a part of the second active pattern 135.

The second storage electrode 174 may include a metal material. The second storage electrode 174 can block some or all of a light source incident on the thin film transistor T2 due to the metal material. Accordingly, the second storage electrode 174 may be formed of a different material from the first storage electrode 172. However, this is only an example, and the present inventive concept is not limited thereto.

At this time, the first storage electrode 172, the second storage electrode 174, and the ground electrode 165 form a storage capacitor Cst. Specifically, the storage capacitor Cst may be defined as a sum of a first capacitance C1 between one side of the ground electrode 165 and the first storage electrode 172 and a second capacitance C2 between the other side of the ground electrode 165 and the second storage electrode 174.

Then, a third interlayer insulating film 230 is formed to cover the upper surfaces of the first storage electrode 172 and the second storage electrode 174 on the second interlayer insulating film 220. The third interlayer insulating film 230 may be formed of substantially the same material as the first interlayer insulating film 210.

Then, a scintillator layer 300 is formed on the third interlayer insulating film 230. The scintillator layer 300 absorbs an external signal, in particular, a photon incident through the X-ray, and emits a light source. The light source generated in the scintillator layer 300 is transmitted to a phototransistor T1 and the phototransistor T1 transmits a charge proportional to an intensity of the light source to a storage capacitor Cst.

The scintillator layer 300 may be formed of a material selected from the group consisting of CsI, GdOxSy, HgI2, PbO, CdTe, CdSe, thallium bromide, and cadmium sulfide, but the present disclosure is not limited thereto.

Although not shown in the drawings, an adhesive layer for adhesion may be formed between the scintillator layer 300 and the third interlayer insulating film 230.

As described above, since the first storage electrode 172 includes a transparent material that transmits a light source emitted from the scintillator layer 300, the light source can be transmitted to the phototransistor T1. On the other hand, since the second storage electrode 174 includes a metal material that blocks the light source emitted from the scintillator layer 300 and covers a second active pattern 135, the thin film transistor T2 may not be affected by the divergent light source. However, this is only an example, and the present disclosure is not limited thereto.

Figure 7:
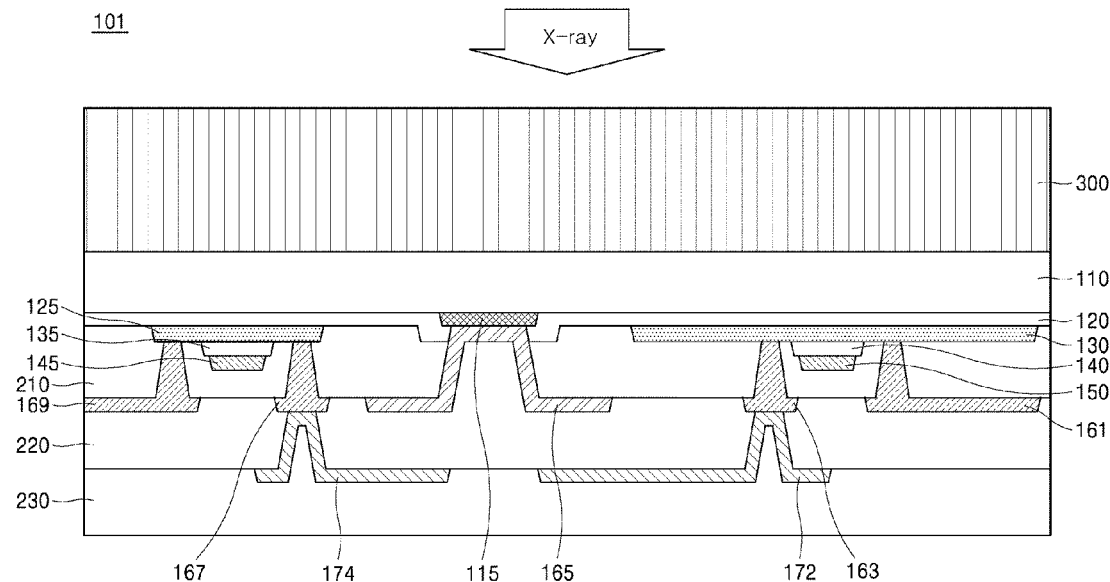
FIG. 7 is a cross-sectional view showing a unit pixel area of an X-ray detector in accordance with another embodiment of the present disclosure.

FIG. 7 is a cross-sectional view showing a unit pixel area of an X-ray detector in accordance with another embodiment of the present disclosure. In the following, the contents overlapped with those described in the above will be omitted, and the difference will be mainly described.

Referring to FIG. 7, the unit pixel area 101 of the X-ray detector in accordance with another embodiment of the present disclosure has a substantially similar structure and operates in a similar manner to the unit pixel area 100 described with reference to FIG. 6.

However, a scintillator layer 300 is arranged on the other surface opposite to one surface of a substrate 110 in contact with a ground line 115. That is, the scintillator layer 300 may be contact with the other surface of the substrate 110. Although not shown in the drawings, an adhesive layer for adhesion may be formed between the scintillator layer 300 and the substrate 110.

In this case, since a light source generated in the scintillator layer 300 is transmitted to a first active pattern 130 through the transparent substrate 110, it is not affected by a material forming a first storage electrode 172 and a second electrode 174 and the structure thereof.

Accordingly, the second storage electrode 174 may be arranged to be overlapped with only a part of a second active pattern 135.

Further, the first storage electrode 172 and the second storage electrode 174 may be formed of the same material. For example, the first storage electrode 172 may be formed of a transparent material that passes the light source or a metal material that blocks the light source. However, this is only an example, and the present inventive concept is not limited thereto.

Figure 8:
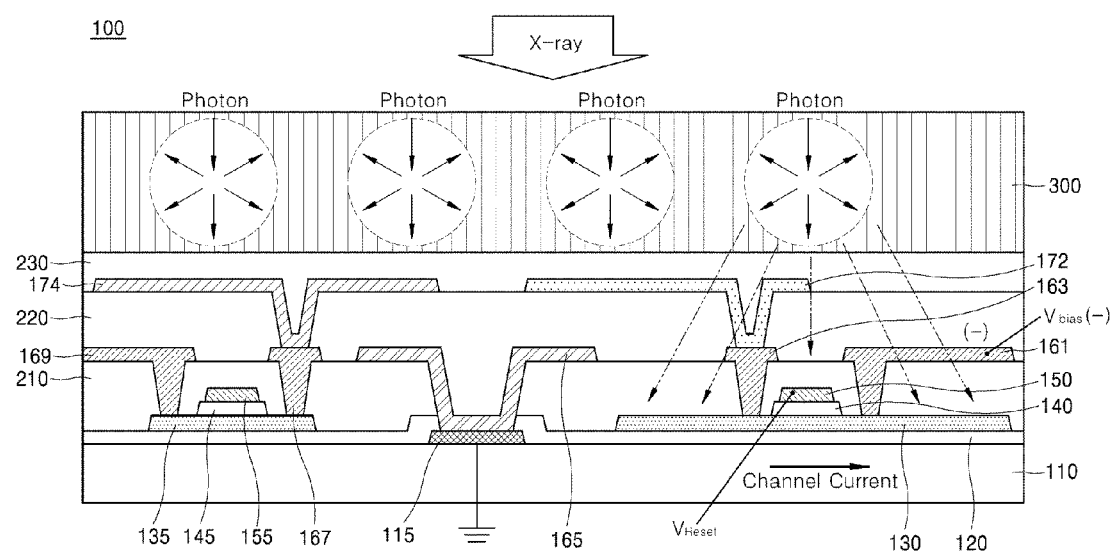
FIGS. 8 to 10 are views explaining an operation of an X-ray detector in accordance with an embodiment of the present disclosure.
Figure 9:
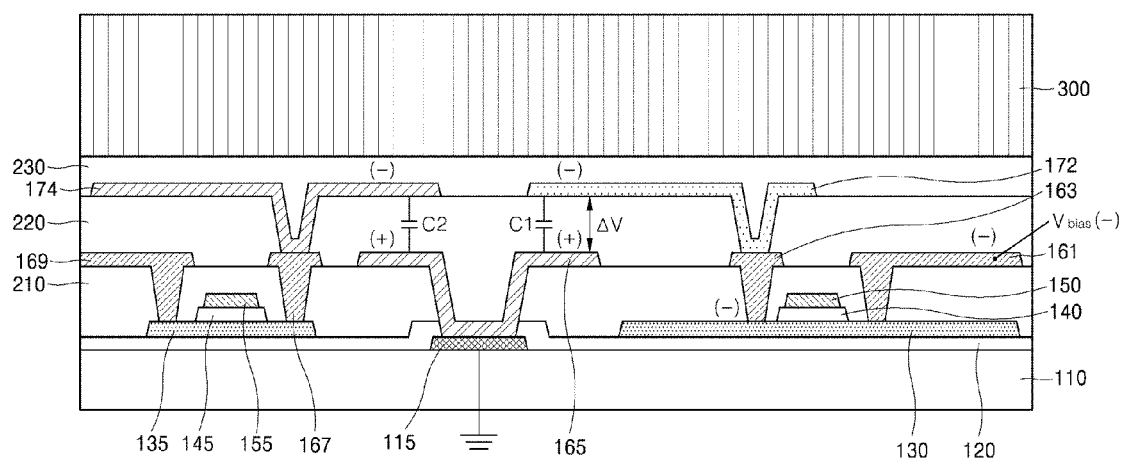
Figure 10:
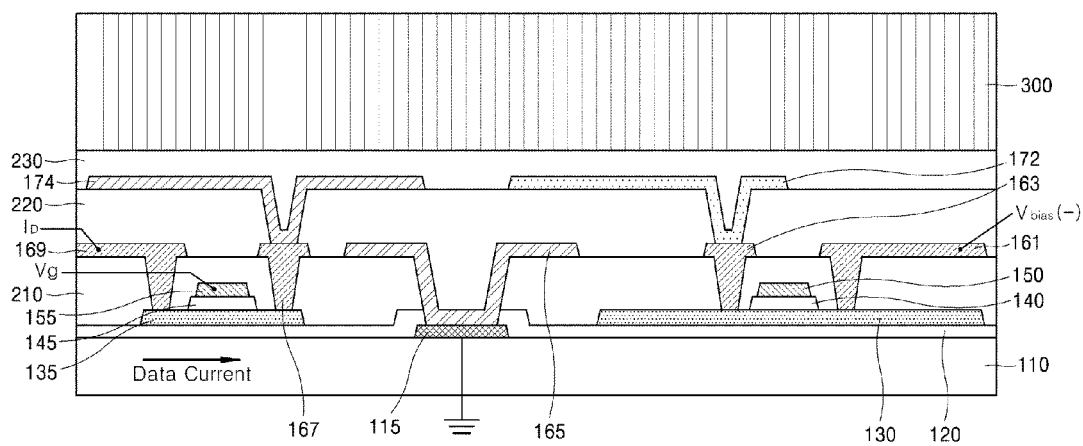

FIGS. 8 to 10 are the views for explaining an operation of an X-ray detector in accordance with an embodiment of the present disclosure.

Referring to FIG. 8, first, in an operation of the X-ray detector in accordance with an exemplary embodiment of the present disclosure, when a signal outside (for example, an X-ray) is incident to a scintillator layer 300, the scintillator layer 300 absorbs an incident photon to emit a light source.

Then, a divergent light is transmitted to a first active pattern 130 through a first storage electrode 172 including a transparent material. On the other hand, since a second storage electrode 174 includes a metal material that blocks a light source emitted from a scintillator layer 300 and covers all the second active pattern 135, a thin film transistor T2 may not be affected by the divergent light source.

For example, the first storage electrode 172 may include a transparent conducting film such as ITO (Indium Tin Oxide), TO (Tin Oxide), IZO (Indium Zinc Oxide), or ITZO (Indium Tin oxide Zinc Oxide). Further, the second storage electrode 174 may include any one of nickel, copper, silver, potassium, magnesium, cadmium, and aluminum, and two or more metals may be used by mixing.

Then, a channel area is formed in the first active pattern 130 by the diverging light source, and as a phototransistor T1 is turned on by a reset signal Vreset transmitted through a first gate line 150, the charges provided in a bias line 161 are moved to the first storage electrode 172 through a first electrode 163.

At this time, a channel current of the phototransistor T1 flows from the first electrode 163 toward the bias line 161, and the electrons move to the first storage electrode 172 by a minus DC power applied from the bias line 161.

Then, referring to FIG. 9, when a phototransistor T1 is turned off, the holes are gathered at a ground electrode by an electrode moved to a first storage electrode 172.

A storage capacitor Cst is defined as a sum of a first capacitance C1 between the ground electrode 165 and the first storage electrode 172 and a second capacitance C2 between the ground electrode 165 and the second storage electrode 174. Therefore, a voltage difference between the first storage electrode 172 and the ground electrode 165 and an amount of charge Q corresponding to a multiplication of a storage capacitance (C1+C2) are stored in a storage capacitor Cst.

Then, referring to FIG. 10, as a thin film transistor T2 is turned on by a gate signal Vg transmitted through a second gate line 155, a charge stored in a storage capacitor Cst are transmitted to a data line 169 and the thin film transistor T2 is turned off again.

Next, although not clearly shown in the drawings, a current signal by the charge transmitted to the data line 169 is transmitted to a ReadOut.

Then, the ReadOut can convert an analog signal related to an acquired image into a digital signal to display an image. For example, when a part of a body is X-raved, an amount of charge to be charged in a charge collecting electrode is large in a part of the body that an X-ray is transmitted, and the amount of charge to be charged in a charge collecting electrode is small in a part of the body where the X-ray penetrates. The difference can be displayed through an image.

The X-ray detector in accordance with some embodiments of the present disclosure includes the unit pixel area having the phototransistor and the storage capacitor in place of the photodiode so that a large area process can be facilitated to improve the yield of the manufacturing process, and as the manufacturing process is reduced, the manufacturing cost can be reduced.

Further, the X-ray detector in accordance with some embodiments of the present disclosure can improve the photodetecting property of the pixel area by using a structure including a phototransistor and a storage capacitor having higher signal sensing sensitivity than a photodiode.

Various substitutions, changes, and modifications can be made within a range that does not depart from the technical scope of the present inventive concept for those skilled in the art to which the present inventive concept pertains, and thus, the above-mentioned present inventive concept is not limited by the above-mentioned embodiments and the accompanying drawings.

What is claimed is:

1. An X-ray detector, comprising:
   a substrate;
   a first gate line on the substrate;
   a second gate line on the substrate, the second gate line spaced apart from the first gate line;
   a data line on the substrate, the data line intersecting the first gate line and the second gate line;
   a bias line on the substrate, the bias line spaced apart from the data line and intersecting the first gate line and the second gate line, the intersections of the data line, bias line, first gate line, and the second gate line defining a unit pixel area;
   a storage capacitor arranged in the unit pixel area, the storage capacitor having one end connected to ground;
   a phototransistor that is turned on by a reset signal applied to the first gate line, the phototransistor connected to another end of the storage capacitor and providing a charge generated by an incident light source to the other end of the storage capacitor; and
   a thin film transistor that is turned on by a gate signal applied to the second gate line, the thin film transistor connected to the other end of the storage capacitor and providing a charge stored in the storage capacitor to the data line.

2. The X-ray detector of claim 1,
   wherein the phototransistor includes a first electrode connected to the bias line, a second electrode connected to the other end of the storage capacitor, and a third electrode connected to the first gate line, and
   wherein the thin film transistor includes a first electrode connected to the other end of the storage capacitor, a second electrode connected to the data line, and a third electrode connected to the second gate line.

3. The X-ray detector of claim 1, wherein the unit pixel area includes a single storage capacitor, a single thin film transistor, and a single phototransistor.

4. The X-ray detector of claim 1, wherein the thin film transistor is turned on and off based on the gate signal after the phototransistor is turned on and off based on the reset signal, the phototransistor transmitting a stored charge in one frame section.

5. The X-ray detector of claim 4, wherein the reset signal comprises a reset section that changes a signal level such that the phototransistor is turned on and off at least once or between the one frame section and a subsequent frame section.

6. The X-ray detector of claim 1, further comprising:
   a ReadOut element configured to receive a current signal transmitted through the data line, the current signal corresponding to the charged stored in the storage capacitor; and
   an analog-to-digital converter (ADC) configured to convert an analog signal outputted from the ReadOut element into a digital signal.

7. An X-ray detector, comprising:
   a substrate;
   a ground line on the substrate;
   an insulating film over the substrate, the insulating film exposing a portion of the ground line;
   a first active pattern and a second active pattern spaced apart from each other on the insulating film;
   a first gate line on the first active pattern;
   a second gate line on the second active pattern;
   a first interlayer insulating film over the first gate line, the second gate line, the first active pattern, the second active pattern, and the insulating film, the first interlayer insulating film comprising a contact hole that exposes the portion of the ground line;
   a bias line on a first side of the first gate line, the bias line in contact with the first active pattern through the first interlayer insulating film;
   a first electrode on a second side of the first gate line that is opposite the first side of the gate line, the first electrode in contact with the first active pattern through the first interlayer insulating film;

a second electrode on a first side of the second gate line, the second electrode in contact with the second active pattern through the first interlayer insulating film;

a data line on a second side of the second gate line that is opposite the first side of the gate line, the data line in contact with the second active pattern through the first interlayer insulating film;

a ground electrode in contact with the exposed portion of the ground line though the contact hole in the first interlayer insulating film;

a second interlayer insulating film over the bias line, the first electrode, the second electrode, the data line, and the ground electrode;

a first storage electrode in contact with the first electrode through the second interlayer insulating film, the first storage electrode overlapping a first end of the ground electrode; and a second storage electrode in contact with the second electrode through the second interlayer insulating film, the second storage electrode overlapping a second end of the ground electrode that is opposite the first end of the ground electrode, the second storage electrode horizontally spaced apart from the first storage electrode.

8. The X-ray detector of claim 7,
wherein the first gate line and the second gate line are spaced apart from each other and extend in a first direction,
wherein the bias line and the data line are spaced apart from each other and extend in a second direction intersecting the first direction, and
wherein intersections of the first gate line, the second gate line, the bias line, and the data line define a unit pixel area.

9. The X-ray detector of claim 8,
wherein the ground line divides the unit pixel area,
wherein the first storage electrode is arranged on a first side of the ground line, and
wherein the second storage electrode is arranged on a second side of the ground line that is non-overlapping with the first side of the ground line.

10. The X-ray detector of claim 7, wherein the second storage electrode completely overlaps the second active pattern on the second interlayer insulating film.

11. The X-ray detector of claim 7, wherein the first storage electrode is formed of a different material from the second storage electrode.

12. The X-ray detector of claim 11,
wherein the first storage electrode comprises a transparent material configured to at least partially pass through light, and
wherein the second storage electrode comprises a metal material configured to block the light.

13. The X-ray detector of claim 7, further comprising:
a third interlayer insulating film on the second interlayer insulating film, the third interlayer insulating film over the first storage electrode and the second storage electrode, and
a scintillator layer on the third interlayer insulating film, the scintillator emitting light toward the first active pattern and the second active pattern.

14. The X-ray detector of claim 7, further comprising:
a scintillator layer under the substrate, the scintillator layer emitting light toward the first active pattern and the second active pattern.

15. The X-ray detector of claim 7, wherein a portion of each of the first electrode, the second electrode, the bias line, and the data line are arranged on a same plane.

16. An X-ray detector, comprising:
a substrate;
a first transistor including a first active pattern on the substrate;
a second transistor including a second active pattern on the substrate;
a ground electrode on the substrate, the ground electrode between the first transistor and the second transistor;
a first storage electrode that partially overlaps the first active pattern and overlaps a first end of the ground electrode;
a second storage electrode that completely overlaps the second active pattern and overlaps a second end of the ground electrode that is opposite the first end of the ground electrode; and
a scintillator layer that emits light in response to receiving an X-ray;
wherein the second storage electrode shields the second active pattern of the second transistor from the emitted light and the first storage electrode partially shields the first active pattern of the first transistor from the emitted light.

17. The X-ray detector of claim 16, wherein the first storage electrode comprises a transparent material and the second storage electrode comprises a non-transparent material.

18. The X-ray detector of claim 16, wherein the first transistor and the second transistor are between the scintillator layer and the substrate.

19. The X-ray detector of claim 16, wherein the substrate is between the first transistor and the second transistor and the scintillator layer.

20. The X-ray detector of claim 16, further comprising:
a ground line on the substrate;
an insulating film over the ground line; and
an interlayer insulating layer over the first active pattern, the second active pattern, and the ground line;
wherein the ground electrode is in contact with a portion of ground line that is exposed via a contact hole through the interlayer insulating layer and the insulating film.

* * * * *